US011188928B2

(12) United States Patent
He

(10) Patent No.: US 11,188,928 B2
(45) Date of Patent: Nov. 30, 2021

(54) MARKETING METHOD AND APPARATUS BASED ON DEEP REINFORCEMENT LEARNING

(71) Applicant: Advanced New Technologies Co., Ltd., Grand Cayman (KY)

(72) Inventor: Jianshan He, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 17/085,190

(22) Filed: Oct. 30, 2020

(65) Prior Publication Data

US 2021/0049622 A1 Feb. 18, 2021

Related U.S. Application Data

(63) Continuation of application No. PCT/CN2019/091713, filed on Jun. 18, 2019.

(30) Foreign Application Priority Data

Aug. 3, 2018 (CN) .......................... 201810879908.2

(51) Int. Cl.
*G06Q 30/02* (2012.01)
*G06N 20/00* (2019.01)

(52) U.S. Cl.
CPC ......... *G06Q 30/0201* (2013.01); *G06N 20/00* (2019.01); *G06Q 30/0246* (2013.01); *G06Q 30/0272* (2013.01)

(58) Field of Classification Search
CPC .......... G06Q 30/0201; G06Q 30/0272; G06Q 30/0246; G06N 20/00
See application file for complete search history.

(56) References Cited

U.S. PATENT DOCUMENTS

2012/0290373 A1 11/2012 Ferzacca et al.
2017/0032417 A1* 2/2017 Amendjian ........ G06Q 30/0254
(Continued)

FOREIGN PATENT DOCUMENTS

CN 106960353 7/2017
CN 107145506 9/2017
(Continued)

OTHER PUBLICATIONS

"Deep Reinforcement Learning for Sponsored Search Real Time Bidding" (J. Zhao et al. Published Mar. 1, 2018, Proceedings of the 24th ACM SIGKDD International Conference on Knowledge Discovery & Data Mining) (Year: 2018).*
(Continued)

*Primary Examiner* — James M Detweiler
(74) *Attorney, Agent, or Firm* — Fish & Richardson P.C.

(57) ABSTRACT

Embodiments of the present specification provide marketing methods based on a deep reinforcement learning system. One method includes the following: obtaining, from an execution environment of a deep reinforcement learning system, a plurality of execution results generated by a user in response to marketing activities, wherein the plurality of execution results correspond to a plurality of targeted effects on a marketing effect chain; determining a reward score of reinforcement learning based on the plurality of execution results; and returning the reward score to a smart agent of the deep reinforcement learning system, for the smart agent to update a marketing strategy, wherein the smart agent is configured to determine the marketing activities based on the marketing strategy and status of the execution environment.

24 Claims, 5 Drawing Sheets

(56) References Cited

U.S. PATENT DOCUMENTS

| | | | | |
|---|---|---|---|---|
| 2018/0165745 A1* | 6/2018 | Zhu | ................... | G06N 20/00 |
| 2018/0165746 A1* | 6/2018 | Huang | ............... | G06F 16/9038 |
| 2018/0342004 A1* | 11/2018 | Yom-Tov | ................. | G06N 7/08 |
| 2018/0374138 A1* | 12/2018 | Mohamed | .............. | G06N 20/00 |
| 2019/0102784 A1* | 4/2019 | Chen | ................. | G06Q 30/0202 |

FOREIGN PATENT DOCUMENTS

| | | |
|---|---|---|
| CN | 107341682 | 11/2017 |
| CN | 108228579 | 6/2018 |
| CN | 108230057 | 6/2018 |
| CN | 109255648 | 1/2019 |
| TW | 201812646 | 4/2018 |
| WO | WO 2015067956 | 5/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/091713, dated Sep. 18, 2019, 9 pages (with partial English translation).

PCT International Preliminary Report on Patentability in International Application No. PCT/CN2019/091713, dated Feb. 9, 2021, 10 pages (with English translation).

\* cited by examiner

MARKETING METHOD AND APPARATUS BASED ON DEEP REINFORCEMENT LEARNING

CROSS-REFERENCE TO RELATED APPLICATIONS

This application is a continuation of PCT Application No. PCT/CN2019/091713, filed on Jun. 18, 2019, which claims priority to Chinese Patent Application No. 201810879908.2, filed on Aug. 3, 2018, and each application is hereby incorporated by reference in its entirety.

TECHNICAL FIELD

One or more embodiments of the present specification relate to the field of machine learning, and in particular, to marketing methods and apparatuses based on deep reinforcement learning.

BACKGROUND

With rapid development of machine learning, various machine learning models have been applied to a variety of service scenarios, such as evaluating credit risks of users, recommending appropriate content to users, sending appropriate marketing information to users, or predicting advertisement delivery effects.

In fact, a complete service process in a service scenario often includes multiple phases or multiple stages, and involves many factors. For example, in a recommendation marketing service scenario, a service can include at least the following stages: selection and sending of marketing information, and user feedback and tracing after the sending. These stages involve many factors and parameters, such as a marketing channel, a sending method, a reach rate, and a conversion rate. Therefore, in attempts to apply machine learning to service scenarios, how to design and select applicable models and what factors need to be introduced to measure service execution results are problems to be considered in the case of many factors and stages in complex service scenarios.

Therefore, improved solutions are expected to improve service execution effects more efficiently by using machine learning.

SUMMARY

One or more embodiments of the present specification describe marketing methods and apparatuses based on deep reinforcement learning, so as to simultaneously learn multiple targets in a recommendation marketing service, thereby comprehensively promoting a service effect.

According to a first aspect, a marketing method based on a deep reinforcement learning system is provided, where the deep reinforcement learning system includes an agent and an execution environment, the agent is configured to determine a marketing behavior based on a marketing strategy and status information of the execution environment, and the method includes the following: obtaining, from the execution environment, multiple execution results generated when a user responds to the marketing behavior, where the multiple execution results respectively correspond to multiple target effects on a marketing effect chain; determining a reward score of reinforcement learning based on the multiple execution results; and returning the reward score to the agent for the agent to update its marketing strategy.

According to some embodiments, the status information of the execution environment can include alternative marketing information and user information of the current user.

In some embodiments, the multiple execution results of the user are obtained in the following method: obtaining an interaction behavior of the user from a server, and obtaining the multiple execution results by using the interaction behavior; or capturing an operation behavior of the user by using a client device user interface tracing point, and obtaining the multiple execution results by using the operation behavior of the user.

In some embodiments, the reward score is determined by using a score evaluation function, where the score evaluation function uses the multiple execution results as variables and is designed to be positively correlated with a match rate between the multiple execution results and multiple corresponding target effects.

In some other embodiments, the determining a reward score of reinforcement learning includes: obtaining independent functions constructed separately for at least some of the multiple execution results, and determining the reward score based on at least a weighted sum of the independent functions.

Further, in some embodiments, the independent functions can be constructed to be positively correlated with a corresponding match rate between an execution result and a target effect.

In some possible embodiments, the multiple execution results include a first execution result, and the first execution result has a discrete result; and the independent functions include a first function, and the first function outputs a discrete value based on the discrete result of the first execution result.

Furthermore, according to some implementations, the first function outputs a first discrete value when the first execution result is a first result and outputs a second discrete value when the first execution result is a second result, where the first result has a higher match rate with a first target effect corresponding to the first execution result than the second result, and the first discrete value is greater than the second discrete value.

According to some implementations, the reward score can further be determined in the following method: determining at least one result combination based on the multiple execution results; obtaining at least one combination function constructed for the at least one result combination; and determining the reward score based on at least a weighted sum of the at least one combination function.

According to some other implementations, the reward score can further be determined in the following method: determining a target effect or a target effect combination that matches the multiple execution results; obtaining a pre-established mapping relationship between a target effect or a target effect combination and a reward score; and determining, based on the mapping relationship, a reward score corresponding to the matched target effect or target effect combination.

According to a second aspect, a marketing apparatus based on a deep reinforcement learning system is provided, where the deep reinforcement learning system includes an agent and an execution environment, the agent is configured to determine a marketing behavior based on a marketing strategy and status information of the execution environment, and the apparatus includes the following: an acquisition unit, configured to obtain, from the execution environment, multiple execution results generated when a user responds to the marketing behavior, where the multiple execution results respectively correspond to multiple target effects on a marketing effect chain; a determining unit, configured to determine a reward score of reinforcement learning based on the multiple execution results; and a returning unit, configured to return the reward score to the agent for the agent to update its marketing strategy.

According to a third aspect, a computing device is provided, and includes a memory and a processor, where the memory stores executable code, and when executing the executable code, the processor implements the method according to the first aspect.

According to the methods and the apparatuses provided in some embodiments of the present specification, the deep reinforcement learning system is used to learn recommendation marketing services. When updating its marketing strategy, the agent considers multiple target effects on the marketing effect chain, that is, the deep reinforcement learning system simultaneously learns multiple targets on the marketing chain, so as to comprehensively learn an entire service process and service targets of recommendation marketing, thereby better promoting a service execution effect.

BRIEF DESCRIPTION OF DRAWINGS

To describe the technical solutions in some embodiments of the present specification more clearly, the following briefly describes the accompanying drawings needed for describing the embodiments. Clearly, the accompanying drawings in the following description show merely some embodiments of the present specification, and a person of ordinary skill in the art can still derive other drawings from these accompanying drawings without creative efforts.

DESCRIPTION OF EMBODIMENTS

The following describes the solutions provided in the present specification with reference to the accompanying drawings.

Figure 1:
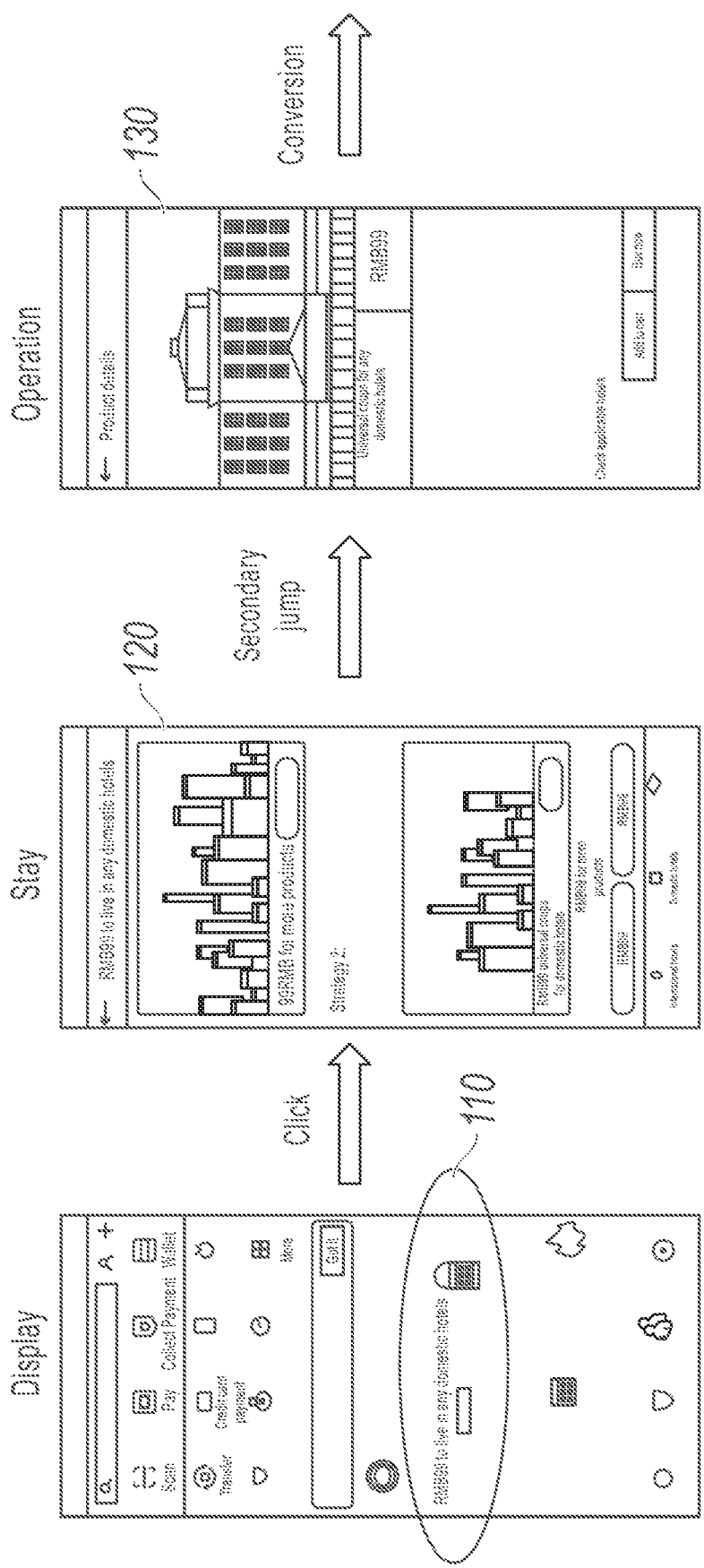
FIG. 1 is a schematic diagram illustrating recommendation marketing execution, according to some embodiments of the present specification.

According to one or more embodiments of the present specification, a deep reinforcement learning method is used to promote a recommendation marketing service effect. FIG. 1 is a schematic diagram illustrating recommendation marketing execution, according to some embodiments of the present specification. In recommendation marketing scenarios, a marketing process can include the following multiple stages. A system first selects, based on some recommendation algorithms, some marketing information suitable for a current user to prepare for recommendation. The marketing information can include an advertisement, a credit package (for example, a red envelope, a shopping voucher, and a coupon), and a marketing notification message, etc. Then, the recommendation marketing information is sent to a marketing delivery platform for delivery. The marketing delivery platform selects, based on predetermined delivery rules and strategies, some marketing information from the recommendation marketing information for exposure. Once a piece of marketing information is exposed, it is considered that the marketing information reaches users. For example, in FIG. 1, when a user opens a client device App (for example, ALIPAY) and sees a certain piece of exposed marketing information (for example, marketing information 110), it is considered that the marketing information reaches the user.

Then, the user may click the marketing information, for example, click the marketing information 110 to enter a new user interface 120. Afterwards, the user may stay on the new user interface 120 for a period of time, and perform a second click (namely, a secondary jump) on an interested element on the user interface 120. For example, the secondary jump jumps to a new user interface 130. On the user interface 130, the user completes a target operation of marketing content, such as registering, forwarding, and using the credit package in the marketing information for consumption. In this case, it can be considered that user conversion is achieved.

The above-mentioned description shows a typical user operation sequence, that is, a typical user marketing effect chain, expected in recommendation marketing. The typical user marketing effect chain includes multiple target effects that are expected to be successively achieved, for example, reach→click→stay→secondary jump→conversion, where user conversion is an ultimate target of recommendation marketing.

In some implementation solutions, modeling and machine learning are performed for the ultimate target to promote service effects. For example, if user conversion is the ultimate target in recommendation marketing, modeling and learning are performed specific to a user conversion rate. However, ultimate user conversion is usually implemented through multiple times of interaction in multiple steps, and a traffic funnel phenomenon naturally exists in an interaction process, that is, the later the step, the lighter the traffic. Therefore, if only an ultimate service indicator, that is, the conversion rate, is learned, a relatively small quantity of positive samples can be used for learning.

In some other implementation solutions, considering that steps in multiple stages of the interaction process have certain impact on the ultimate target, modeling and learning are separately performed on a target effect of each stage. For example, modeling and learning are separately performed for a reach stage and a click stage, etc. to obtain, for example, a reach rate estimation model, a click-through rate estimation model, and a conversion rate estimation model, etc. With such solutions, more samples used for learning can be obtained, and targeted learning can be performed for each stage. However, in these solutions, each model is trained separately, and a cost is high. If an overall service execution effect needs to be estimated, multiple models need to be used for prediction one by one and prediction results need to be combined. Complexity and an operation cost of a prediction process are relatively high.

Figure 2A:
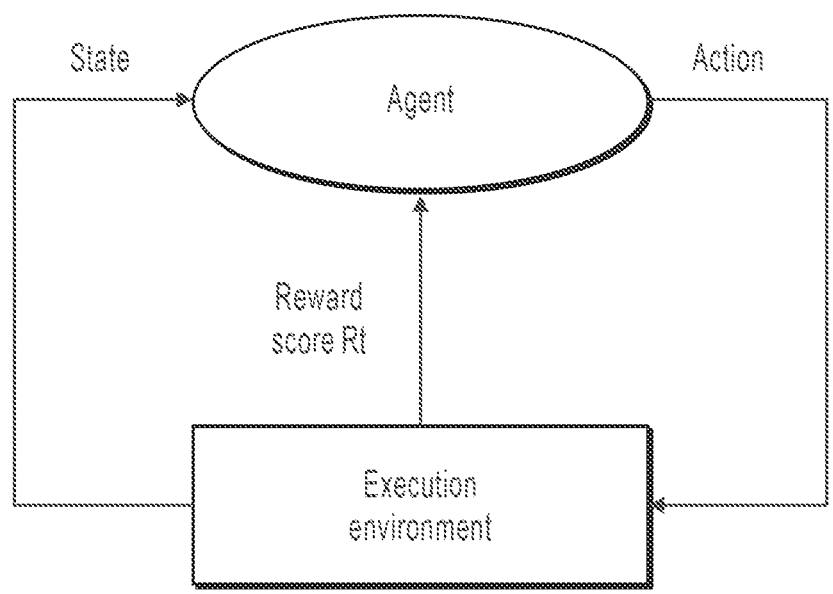
FIG. 2A illustrates a typical deep reinforcement learning system.

Based on comprehensive consideration of the above-mentioned solutions, some embodiments of the present specification further propose a solution that uses a deep reinforcement learning system for recommendation marketing. FIG. 2A illustrates a typical deep reinforcement learning system. Generally, the deep reinforcement learning system includes an agent and an execution environment, and the agent continuously learns and optimizes its strategy through interaction and feedback with the execution environment. Specifically, the agent observes and obtains a state of the execution environment, and determines, based on a certain strategy and the state of the execution environment, a behavior or an action to take. Such a behavior affects the execution environment, changes the state of the execution environment, and generates feedback to the agent. The feedback is also referred to as a reward score. Based on the obtained reward score, the agent determines whether the above-mentioned behavior is correct and whether the strategy needs to be adjusted, so as to update its strategy. The agent can continuously update the strategy by constantly observing a state, determining a behavior, and receiving feedback. An ultimate objective is to learn a strategy, so that the obtained reward score is maximized. The above-mentioned description is a typical reinforcement learning process. During strategy learning and adjustment, if the agent uses some deep learning algorithms including a neural network algorithm, such a system is referred to as a deep reinforcement learning system.

Figure 2B:
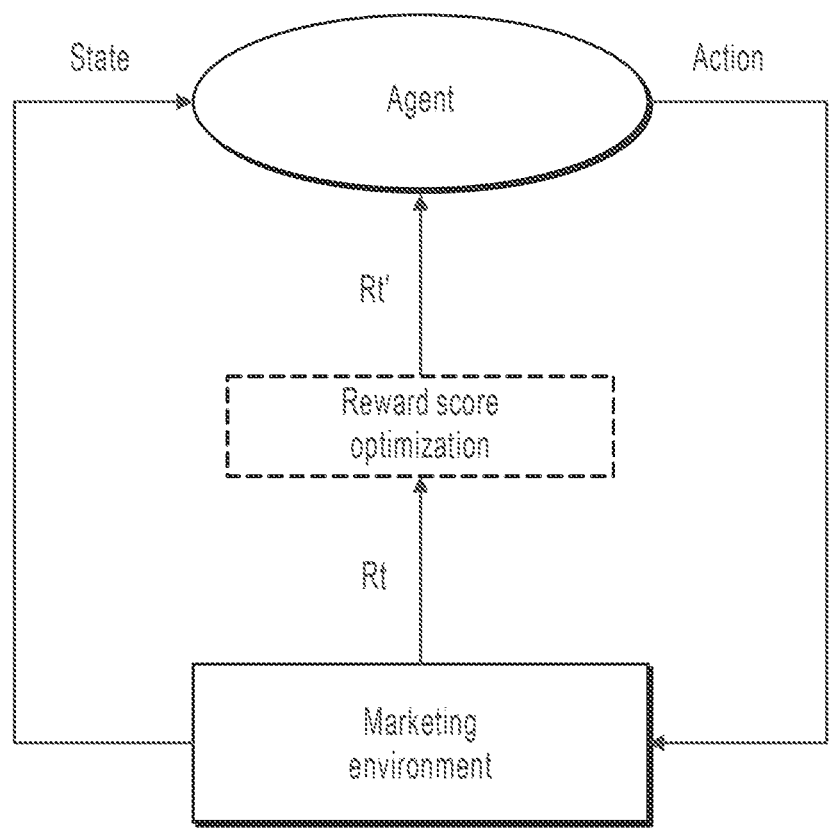
FIG. 2B illustrates a deep reinforcement learning-based recommendation marketing system, according to some embodiments.

FIG. 2B illustrates a deep reinforcement learning-based recommendation marketing system, according to some embodiments. To be specific, deep reinforcement learning is applied to a recommendation marketing system. In recommendation marketing scenarios, the execution environment is a recommendation marketing environment, and an observable environment state includes to-be-recommended marketing information and current user information, etc. The agent determines an appropriate marketing behavior based on some marketing strategies and a current state of the marketing environment. The marketing behavior changes the state of the marketing environment and generates a reward score, which is fed back to the agent. The agent can further adjust and update its marketing strategy based on the reward score. According to one or more embodiments of the present specification, a reward score generation process is optimized, and a comprehensive reward score is determined based on multiple execution results (for example, whether a click is performed, whether a secondary jump exists, and stay duration) corresponding to the multiple target effects on the marketing effect chain. As such, an update of the agent's marketing strategy considers the multiple target effects on the marketing effect chain, that is, the deep reinforcement learning system simultaneously learns multiple targets on the marketing chain, so as to comprehensively learn an entire service process and service targets of recommendation marketing, thereby better promoting a service execution effect. The following describes implementations of the above-mentioned idea.

Figure 3:
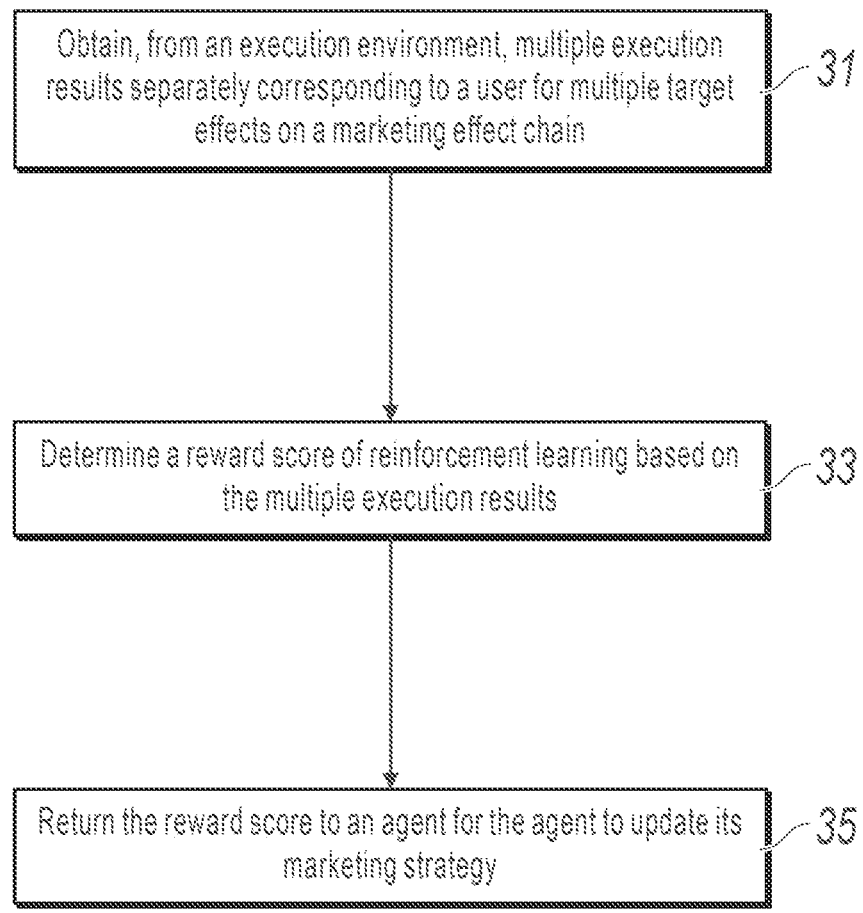
FIG. 3 illustrates a marketing method based on a deep reinforcement learning system, according to some embodiments.

FIG. 3 illustrates a marketing method based on a deep reinforcement learning system, according to some embodiments. It can be understood that the deep reinforcement learning system can be the deep reinforcement learning-based recommendation marketing system shown in FIG. 2B. The deep reinforcement learning system includes an agent and an execution environment. The agent is configured to determine a marketing behavior based on a marketing strategy and a state of the execution environment, and update the marketing strategy based on a reward score fed back for the marketing behavior. The method can be performed by any apparatus, device, platform, or device cluster, etc. that has data computing and processing capabilities. As shown in FIG. 3, the method includes at least the following: step 31: obtaining, from the execution environment, multiple execution results separately corresponding to a user for multiple target effects on a marketing effect chain, where the multiple execution results are generated when the user responds to the marketing behavior determined by the agent; step 33: determining a reward score of reinforcement learning based on the multiple execution results; and step 35: returning the reward score to the agent for the agent to update its marketing strategy. The following describes specific implementations of the above-mentioned steps.

As described above, in the deep reinforcement learning-based recommendation marketing system, the agent continuously observes and obtains a current state of the recommendation marketing environment, and determines, based on the marketing strategy, a marketing behavior to take in the current state. In some implementations, state information of the marketing environment obtained by the agent can include optional marketing information and user information of a current user. More specifically, the optional marketing information can include optional marketing content, such as an alternative advertisement, a credit package (such as a red envelope, a shopping voucher, and a coupon), and a marketing notification message. The optional marketing information can further include optional marketing channels, such as a message sending, an advertisement banner, and a badge reminder. On the other hand, the state information of the marketing environment further includes the user information of the current user, and the user information can include user attribute characteristics, such as a registration time period, an age, a gender, and an income. In some embodiments, the user information further includes the user's historical behavior information, such as a historical operation sequence, a list of recently browsed user interfaces, and a list of recently accepted marketing information. In some embodiments, the user information can include user profile information. It can be understood that, in some implementations, a corresponding user profile is granted to the user based on some algorithms, and basic attribute information and/or historical behavior information of the user. The user profile information can include, for example, a crowd label for classifying the user into a specific crowd based on attribute information, a cluster label for clustering the user, and a user behavior habit label constructed based on historical user behaviors, etc. The various user information can constitute a user feature of the current user.

In some specific examples, a state vector of the current state of the marketing environment is constructed based on a marketing feature corresponding to the marketing information and the user feature corresponding to the current user, and then is input to the agent. Based on some marketing strategies and the current state of the marketing environment, the agent determines the marketing behavior to take.

It can be understood that, for the reinforcement learning system, a strategy in the agent is used to map the state of the environment to the next behavior. In the deep reinforcement learning-based recommendation marketing system shown in FIG. 2B, the agent is an entity that makes a decision, and maps, based on the marketing strategy, the current state of the marketing environment to the next marketing behavior to take. The marketing strategy is implemented by using complex deep learning algorithms, such as Q-learning and DQN. These algorithms generally include some deep neural network structures. As described above, the current state of the marketing environment reflects the user feature of the current user and a feature of the optional marketing information. Once obtaining such current state information, the agent can determine, by using a deep learning algorithm, the marketing behavior to take for the current user, for example, determine specific marketing content and a specific channel used to send the marketing content to the user.

An execution result is generated accordingly after such a marketing behavior affects the execution environment. Therefore, in step 31, the multiple execution results generated for the multiple target effects on the marketing effect chain when the user responds to the above-mentioned marketing behavior can be obtained from the execution environment.

FIG. 1 shows a marketing effect chain, according to some specific examples. The marketing effect chain includes multiple target effects that are expected to be successively achieved, including reach→click→stay→secondary jump→conversion. Correspondingly, the execution results of the user for these target effects can include a marketing-to-user reach status (for example, whether the user is reached, a reach time, or a display time), the user's click status (for example, whether a click is performed), the user's stay duration, the user's second-click status (for example, whether a second click, that is, a secondary jump, is performed), and a user conversion status (for example, whether the user is converted).

In some embodiments, the execution results of the user for the target effects are reflected as interaction between the user and the execution environment, especially interaction between the user and a marketing server. Therefore, the execution results can be obtained by obtaining an interaction behavior of the user from the server. In some other embodiments, an operation behavior of the user can further be captured by using a client device user interface tracing point, and the execution results of the user for the target effects can be obtained by using the operation behavior of the user.

For the obtained multiple execution results generated for the multiple target effects when the user responds to the marketing behavior, in step 33, the reward score of reinforcement learning is determined based on the multiple execution results.

The following describes the determining of the reward score with reference to the corresponding user execution results and the marketing effect chain of reach→click→stay→secondary jump→conversion.

In some embodiments, a score evaluation function is constructed by using all of the multiple execution results as variables, and the score evaluation function is designed to be positively correlated with a match rate between the multiple execution results and the corresponding multiple target effects. To be specific, a higher overall match rate between the multiple execution results and the corresponding multiple target effects can indicate a larger output value of the evaluation function, that is, a higher reward score.

The score evaluation function is as follows:

$$Rt = f(X1, X2, \ldots, Xn) \qquad (1)$$

$X1, X2, \ldots$, and $Xn$ are execution results respectively corresponding to target effects $Y1, Y2, \ldots$, and $Yn$. In addition, the score evaluation function f is designed as follows: A higher match rate between the execution results $X1, X2, \ldots, Xn$ and the target effects $Y1, Y2, \ldots$, and $Yn$ can indicate a higher Rt score.

In some other embodiments, corresponding independent functions are separately constructed for at least some of the multiple execution results. During determining of the reward score, these pre-constructed independent functions are obtained, and the reward score is determined based on at least a weighted sum of these independent functions. More specifically, an independent function $fi(Xi)$ is constructed for the execution result $Xi$ of the ith item, and a final reward score is determined as follows:

$$Rt = Wi*fi(Xi) \qquad (2)$$

Wi is a weight corresponding to the ith execution result.

For example, in the above-mentioned example of the marketing effect chain, the multiple execution results include X1=display, indicating a reach status; X2=click, indicating a click status; X3=stay, indicating the user's stay duration; X4=click2, indicating a second-click status; and X5=convert, indicating a conversion status. Therefore, the reward score can be determined as follows:

$$Rt = W1*f1(\text{display}) + W2*f2(\text{click}) + W3*f3(\text{stay}) + W4*f4(\text{click2}) + W5*f5(\text{convert}) \qquad (3)$$

In some embodiments, at least one independent function $fi(Xi)$ is determined to be positively correlated with a match rate between the execution result $Xi$ and the corresponding target effect $Yi$. To be specific, a higher match rate between $Xi$ and $Yi$ can indicate a larger value of $fi(Xi)$.

In still some other embodiments, at least one result combination is determined based on the multiple execution results. Each result combination includes two or more execution results. At least one combination function is constructed for the at least one result combination. The reward score is determined based on at least a weighted sum of the at least one combination function.

For example, in the above-mentioned example of the multiple execution results of X1 to X5, X1 and X2 can be selected as a first result combination, and a first combination function F1 is constructed for X1 and X2; and X3 and X4 are selected as a second result combination, and a second combination function F2 is constructed for X3 and X4. The result combinations can include different quantities of execution results.

Therefore, in some specific examples, the reward score can be determined as follows:

$$Rt = WF1*F1(\text{display,click}) + WF2*F2(\text{stay,click2}) \qquad (4)$$

The present embodiment can be combined with the embodiment corresponding to equation (2) or equation (3). For example, corresponding independent functions are constructed for execution results that are not selected into a result combination, and weighted summation is performed on these independent functions and the combination function. Or, weighted summation on a combination function is further introduced based on weighted summation on functions corresponding to the execution results. Or, some of the multiple execution results are selected to construct corresponding independent functions, and weighted summation is performed on these independent functions and a combination function.

For example, in some specific examples, the reward score can be determined as follows:

$$Rt = W3*f3(\text{stay}) + W4*f4(\text{click2}) + W5*f5(\text{convert}) + WF1*F1(\text{display,click}) + WF2*F2(\text{stay,click2}) \qquad (5)$$

X3, X4, and X5 are selected from X1 to X5, and independent functions are constructed for X3, X4, and X5. X1 and X2 are selected as a first combination, and a first combination function F1 is constructed. X3, X4 are selected as a second combination, and a second combination function F2 is constructed. Weighted summation is performed on the independent functions and the combination functions to determine the reward score.

In some embodiments, the multiple execution results include a first-type execution result, and such an execution result have a discrete result value. For example, X2 can indicate the click status. In some examples, the click status can be divided into binary discrete result values of "clicked" or "not clicked".

A discrete function can be constructed for such a first-type execution result as its independent function, and the discrete function outputs a discrete function value based on the discrete result value of the execution result. Further, in some embodiments, a discrete function fi is set for a first-type execution result Xi, and a discrete output value of the discrete function fi can be set as follows: A higher match rate between the discrete result value of the execution result Xi and the corresponding target effect Yi can indicate a larger discrete value output by fi. For example, a discrete function f2(X2) can be constructed for X2. When X2 corresponds to "clicked", f2 outputs a discrete value V1, or when X2 corresponds to "not clicked", f2 outputs a discrete value V2. More specifically, because the corresponding target effect is "clicked", X2 corresponding to "clicked" better matches the target effect. Therefore, in some examples, V1 can be set to be greater than V2, for example, V1=1 and V2=0.

The present embodiment can be combined with any one of the embodiments corresponding to equation (2) to equation (5), to set an independent function specific to the first-type execution result as a discrete function that outputs a discrete value. For example, in combination with equation (3), for X1, X2, X4, and X5 that have binary results in X1 to X5, their corresponding independent functions can be reconstructed as I, which can indicate a function that outputs 0 or 1. In this case, equation (3) can be reconstructed as follows:

$$Rt = W1*I(\text{display}) + W2*I(\text{click}) + W3*f3(\text{stay}) + W4*I(\text{click2}) + W5*I(\text{convert}) \quad (6)$$

The function I(X) outputs 1 when X is true and 0 when X is false. It can be understood that X being true corresponds to a case consistent with a target effect.

In some embodiments, the multiple execution results further include a second-type execution result. Such an execution result corresponds to a continuous variable. For example, X3 represents stay duration, and the stay duration can be represented as a continuous variable using seconds as its unit. A second-type function whose output is a continuous value can be constructed for the second-type execution result. In some specific examples, the second-type function can be a logical regression function. In some other specific examples, a linear regression function is constructed for the second-type execution result.

For example, for the continuous variable X3, a corresponding function f3 can be constructed as follows:

$$f3(X3) = A + B*X3 \quad (7)$$

A and B are predetermined linear parameters.

It can be understood that the embodiment corresponding to equation (7) can be combined with any one of the embodiments corresponding to equation (2) to equation (6).

According to some other implementations, a mapping relationship between a target effect or target effect combination to be achieved and a reward score is pre-established. After an execution result corresponding to a target effect is obtained, a target effect combination matched with the current execution result is determined, and further a corresponding reward score is determined based on the mapping relationship.

In some specific examples, pre-established mapping relationships can be listed in the following table.

TABLE 1

| Reward score | Target effect/Target effect combination |
|---|---|
| 1 | Display |
| 2 | Display + click |

TABLE 1-continued

| Reward score | Target effect/Target effect combination |
|---|---|
| 3 | Stay |
| 4 | Stay + secondary jump |
| 5 | Conversion |

As listed in Table 1, for the target effects that are expected to be successively achieved on the marketing effect chain, if only the target "display" or "reach" is achieved, the reward score is 1; if the target effect "click" by a user is further achieved based on "display", the reward score is 2, and so on. A higher match rate between an achieved target effect and the ultimate target on the marketing effect chain can indicate a high reward score.

Based on such mapping relationships, after an execution result corresponding to each target effect is obtained, comparison and matching are performed between each execution result and the corresponding target effect, so as to determine a target effect or a target effect combination matched with the current execution result, and further, a corresponding reward score can be determined by searching the mapping relationships in Table 1.

It should be understood that Table 1 is merely an example. More, less, or different target effects or target effect combinations can be set based on service needs, and different score values can be correspondingly set for the reward scores.

The above-mentioned description describes multiple methods for determining a reward score with reference to the marketing effect chain of reach→click→stay→secondary jump→conversion. It can be understood that the marketing effect chain is not limited to the above-mentioned example, but can include more, less, or different target effects. For example, in some marketing scenarios, after a user performs a click, the user either is converted or exits, without requiring a secondary jump. In some other marketing scenarios, a user may further perform a click after a secondary jump, for example, a third jump occurs. In still some other marketing scenarios, a user may perform other interaction, such as entering personal information, after performing a click or performing a secondary jump. These operations can be used as predetermined target effects on a marketing effect chain, other marketing scenarios, a user may perform other interaction, such as entering personal information, after performing a click or performing a secondary jump. These operations can be used as predetermined target effects on a marketing effect chain, and can further be used as objects learned by the reinforcement learning system.

The reward score of reinforcement learning is determined based on the multiple execution results of the user for the multiple target effects on the marketing effect chain. Therefore, in step 35, the reward score is returned to the agent for the agent to update its marketing strategy.

As described above, the agent continuously obtains feedback of the reward score from the environment to determine whether the above-mentioned marketing strategy and marketing behavior are appropriate, so as to update the marketing strategy. It should be noted that, updating the marketing strategy here includes not only modifying or adjusting the above-mentioned marketing strategy when it is determined that the delivered marketing behavior is improper, but also enhancing or maintaining an original marketing strategy when it is determined that the marketing behavior has a good effect. In one or more embodiments of the present specification, as the reward score is determined based on the multiple execution results of the user for the multiple target effects, the agent comprehensively considers the execution results for the multiple target effects when updating the marketing strategy, that is, learns the multiple target effects on the marketing effect chain. As such, the deep reinforcement learning system comprehensively learns an entire service process and service targets of recommendation marketing, thereby better promoting a service execution effect.

According to another aspect, some embodiments of the present specification further provide an apparatus. The apparatus is applied to a system that performs recommendation marketing by using deep reinforcement learning. As shown in FIG. 2B, a deep reinforcement learning system includes an agent and an execution environment, and the agent is configured to determine a marketing behavior based on a marketing strategy and status information of the execution environment. The apparatus can be implemented by any software, hardware, or hardware and software combination that has computing and processing capabilities. In some embodiments, the apparatus can be integrated into the execution environment of the deep reinforcement learning system. In some other embodiments, the apparatus can be integrated into an entity apparatus for implementing the agent in the deep reinforcement learning system. In still some other embodiments, the apparatus is used as an independent apparatus to extract data from the execution environment for processing to obtain a reward score and return the reward score to the agent.

Figure 4:
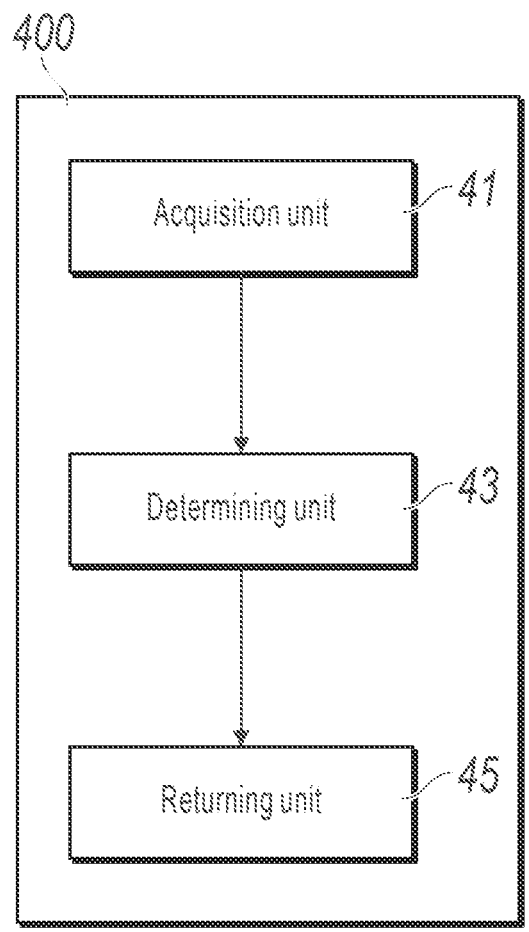
FIG. 4 is a schematic block diagram illustrating an apparatus, according to some embodiments.

FIG. 4 is a schematic block diagram illustrating an apparatus, according to some embodiments. As shown in FIG. 4, the apparatus 400 includes: an acquisition unit 41, configured to obtain, from the execution environment, multiple execution results generated when a user responds to the marketing behavior, where the multiple execution results respectively correspond to multiple target effects on a marketing effect chain; a determining unit 43, configured to determine a reward score of reinforcement learning based on the multiple execution results; and a returning unit 45, configured to return the reward score to the agent for the agent to update its marketing strategy.

In some embodiments, the status information of the execution environment includes alternative marketing information and user information of the current user.

In some embodiments, the obtaining unit 41 obtains the multiple execution results of the user in the following method: obtaining an interaction behavior of the user from a server, and obtaining the multiple execution results by using the interaction behavior; or capturing an operation behavior of the user by using a client device user interface tracing point, and obtaining the multiple execution results by using the operation behavior of the user.

In some embodiments, the determining unit 43 determines the reward score by using a score evaluation function, where the score evaluation function uses the multiple execution results as variables and is designed to be positively correlated with a match rate between the multiple execution results and multiple corresponding target effects.

In some other embodiments, the determining unit 43 determines the reward score in the following method: obtaining independent functions constructed separately for at least some of the multiple execution results, and determining the reward score based on at least a weighted sum of the independent functions.

Further, in some examples, the independent functions can be constructed to be positively correlated with a corresponding match rate between an execution result and a target effect.

In some examples, the multiple execution results include a first execution result, and the first execution result has a discrete result; and the independent functions include a first function, and the first function outputs a discrete value based on the discrete result of the first execution result.

In some further examples, the first function outputs a first discrete value when the first execution result is a first result and outputs a second discrete value when the first execution result is a second result, where the first result has a higher match rate with a first target effect corresponding to the first execution result than the second result, and the first discrete value is greater than the second discrete value.

According to some implementations, the determining unit 43 can further determine the reward score as follows: determining at least one result combination based on the multiple execution results; obtaining at least one combination function constructed for the at least one result combination; and determining the reward score based on at least a weighted sum of the at least one combination function.

According to some other implementations, the determining unit 43 determines the reward score as follows: determining a target effect or a target effect combination that matches the multiple execution results; obtaining a pre-established mapping relationship between a target effect or a target effect combination and a reward score; and determining, based on the mapping relationship, a reward score corresponding to the matched target effect or target effect combination.

Because the determining unit 43 determines the reward score based on the user's multiple execution results of the multiple target effects. Therefore, when updating its marketing strategy, the agent comprehensively considers the execution results of the multiple target effects, so that the deep reinforcement learning system comprehensively learns an entire service process and service targets of recommendation marketing, thereby better promoting a service execution effect.

According to some embodiments of still another aspect, a computing device is further provided, including a memory and a processor, where the memory stores executable code, and when executing the executable code, the processor implements the method described with reference to FIG. 3.

A person skilled in the art should be aware that in the above-mentioned one or more examples, functions described in the present specification can be implemented by hardware, software, firmware, or any combination thereof. When the present specification is implemented by software, the functions can be stored in a computer readable medium or transmitted as one or more instructions or code in the computer readable medium.

The objectives, technical solutions, and beneficial effects of the present specification are further described in detail in the above-mentioned specific implementations. It should be understood that the above-mentioned descriptions are merely specific implementations of the present specification, but are not intended to limit the protection scope of the present specification. Any modification, equivalent replacement, or improvement made based on the technical solutions of the present specification shall fall within the protection scope of the present specification.

What is claimed is:

1. A computer-implemented method performed based on a deep reinforcement learning, comprising:
obtaining a plurality of execution results associated with a user in response to received content, wherein the plurality of execution results correspond to a plurality of targeted effects on a marketing effect chain;

determining a reward score that is reflective of user behavior based on the plurality of execution results using a deep learning algorithm, wherein the deep learning algorithm is trained by:

obtaining, by the deep learning algorithm, a state of an execution environment where the user is situated;

generating, by the deep learning algorithm, an execution result to be taken based on the state of the execution environment;

determining a single execution score for an execution result ($X_i$) and a combined execution score for an combination of at least two execution results ($X_i$, $X_{i+1}$);

determining a targeted effect $Y_i$ for each execution result ($X_i$) and each combination of at least two execution results ($X_i$, $X_{i+1}$), wherein the single execution score of the execution result ($X_i$) and the combined execution score of the combination of at least two execution results ($X_i$, $X_{i+1}$) are obtained when the execution result ($X_i$) and the combination of at least two execution results ($X_i$, $X_{i+1}$) match their corresponding targeted effect $Y_i$;

determining at least one independent function $f_i$ and least one combination function $F_i$ for calculating the reward score, wherein the independent function f comprises at least one execution result ($X_i$) selected from the plurality of execution results, and the combination function F comprises at least two execution results ($X_i$, $X_{i+1}$) selected from the plurality of execution results, and wherein the independent function $f_i$ and the combination function $F_i$ are expected to output an optimized score when the execution result $X_i$ matches the targeted effect $Y_i$;

determining a reward score for the execution result to be taken based on a score evaluation function:

$$Rt = W_1 \times f_1(X_1) + W_2 F_2 \times F_2(X_2, X_3) \ldots$$

wherein Rt is the reward score and Wi is a weight predetermined corresponding to each execution result $X_i$;

inputting the reward score for the execution result to be taken to the deep learning algorithm; and adjusting, by the deep learning algorithm, the state of the execution environment based on the reward score for the execution result to be taken; and updating, by the deep learning algorithm, the received content;

and continuously updating, by the trained deep learning algorithm, distribution of content to the user by constantly obtaining a plurality of current execution results associated with the user and constantly determining updated reward scores based on the plurality of current execution results.

2. The computer-implemented method according to claim 1, wherein the plurality of execution results are obtained based on an interaction behavior of the user obtained from a server or an operation behavior of the user obtained from an interface of a client device operated by the user.

3. The computer-implemented method according to claim 1, wherein the plurality of targeted effects on the marketing effect chain comprise delivery of marketing information, first and subsequent clicking of the marketing information, browsing of the marketing information for at least a predetermined amount of time, and placing an order in response to the marketing information.

4. The computer-implemented method according to claim 1, wherein the score evaluation function uses the plurality of execution results $X_i$ as variables and is positively correlated with a match rate between the plurality of execution results $X_i$ and a corresponding plurality of targeted effects $Y_i$.

5. The computer-implemented method according to claim 1, wherein the at least one independent function is generated to be positively correlated with a match rate between corresponding at least one of the plurality of execution results and at least one of the plurality of targeted effects.

6. The computer-implemented method according to claim 1, wherein the plurality of execution results comprise a first execution result that comprises a discrete result value, and the at least one independent function comprises a first function, and the first function outputs a discrete function value based on the discrete result value of the first execution result.

7. The computer-implemented method according to claim 6, wherein the first function outputs a first discrete value when the first execution result has a first result value and outputs a second discrete value when the first execution result has a second result value, wherein the first result value has a higher match rate with a first targeted effect corresponding to the first execution result than the second result value, and the first discrete value is greater than the second discrete value.

8. The computer-implemented method according to claim 1, wherein the deep learning algorithm is further trained by:

determining a targeted effect combination that matches the plurality of execution results, wherein the targeted effect combination comprises at least a portion of the plurality of targeted effects;

obtaining a predetermined mapping relationship between the targeted effect combination and the reward score; and determining, based on the predetermined mapping relationship, the reward score corresponding to the targeted effect combination.

9. A non-transitory, computer-readable medium storing one or more instructions executable by a computer system to perform operations comprising:

obtaining a plurality of execution results associated with a user in response to received content, wherein the plurality of execution results correspond to a plurality of targeted effects on a marketing effect chain;

determining a reward score that is reflective of user behavior based on the plurality of execution results using a deep learning algorithm, wherein the deep learning algorithm is trained by:

obtaining, by the deep learning algorithm, a state of an execution environment where the user is situated;

generating, by the deep learning algorithm, an execution result to be taken based on the state of the execution environment;

determining a single execution score for an execution result ($X_i$) and a combined execution score for an combination of at least two execution results ($X_i$, $X_{i+1}$);

determining a targeted effect $Y_i$ for each execution result ($X_i$) and each combination of at least two execution results ($X_i$, $X_{i+1}$), wherein the single execution score of the execution result ($X_i$) and the combined execution score of the combination of at least two execution results ($X_i$, $X_{i+1}$) are obtained when the execution result ($X_i$) and the combination of at least two execution results ($X_i$, $X_{i+1}$) match their corresponding targeted effect $Y_i$;

determining at least one independent function fi and least one combination function $F_i$ for calculating the reward score, wherein the independent function f comprises at least one execution result $(X_i)$ selected from the plurality of execution results, and the combination function F comprises at least two execution results $(X_i, X_{i+1})$ selected from the plurality of execution results, and wherein the independent function $f_i$ and the combination function $F_i$ are expected to output an optimized score when the execution result $X_i$ matches the targeted effect $Y_i$;

determining a reward score for the execution result to be taken based on a score evaluation function:

$$Rt = W_1 \times f_1(X_1) + W_2 F_2 \times F_2(X_2, X_3) \ldots$$

wherein Rt is the reward score and Wi is a weight predetermined corresponding to each execution result $X_i$;

inputting the reward score for the execution result to be taken to the deep learning algorithm; and adjusting, by the deep learning algorithm, the state of the execution environment based on the reward score for the execution result to be taken; and updating, by the deep learning algorithm, the received content;

and continuously updating, by the trained deep learning algorithm, distribution of content to the user by constantly obtaining a plurality of current execution results associated with the user and constantly determining updated reward scores based on the plurality of current execution results.

10. The non-transitory, computer-readable medium according to claim 9, wherein the plurality of execution results are obtained based on an interaction behavior of the user obtained from a server or an operation behavior of the user obtained from an interface of a client device operated by the user.

11. The non-transitory, computer-readable medium according to claim 9, wherein the plurality of targeted effects on the marketing effect chain comprise delivery of marketing information, first and subsequent clicking of the marketing information, browsing of the marketing information for at least a predetermined amount of time, and placing an order in response to the marketing information.

12. The non-transitory, computer-readable medium according to claim 9, wherein the score evaluation function uses the plurality of execution results $X_i$ as variables and is positively correlated with a match rate between the plurality of execution results $X_i$ and a corresponding plurality of targeted effects $Y_i$.

13. The non-transitory, computer-readable medium according to claim 9, wherein the at least one independent function is generated to be positively correlated with a match rate between corresponding at least one of the plurality of execution results and at least one of the plurality of targeted effects.

14. The non-transitory, computer-readable medium according to claim 9, wherein the plurality of execution results comprise a first execution result that comprises a discrete result value, and the at least one independent function comprises a first function, and the first function outputs a discrete function value based on the discrete result value of the first execution result.

15. The non-transitory, computer-readable medium according to claim 14, wherein the first function outputs a first discrete value when the first execution result has a first result value and outputs a second discrete value when the first execution result has a second result value, wherein the first result value has a higher match rate with a first targeted effect corresponding to the first execution result than the second result value, and the first discrete value is greater than the second discrete value.

16. The non-transitory, computer-readable medium according to claim 9, wherein the deep learning algorithm is further trained by:

determining a targeted effect combination that matches the plurality of execution results, wherein the targeted effect combination comprises at least a portion of the plurality of targeted effects;

obtaining a predetermined mapping relationship between the targeted effect combination and the reward score; and determining, based on the predetermined mapping relationship, the reward score corresponding to the targeted effect combination.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining a plurality of execution results associated with a user in response to received content, wherein the plurality of execution results correspond to a plurality of targeted effects on a marketing effect chain;

determining a reward score that is reflective of user behavior based on the plurality of execution results using a deep learning algorithm, wherein the deep learning algorithm is trained by:

obtaining, by the deep learning algorithm, a state of an execution environment where the user is situated;

generating, by the deep learning algorithm, an execution result to be taken based on the state of the execution environment;

determining a single execution score for an execution result $(X_i)$ and a combined execution score for an combination of at least two execution results $(X_i, X_{i+1})$;

determining a targeted effect $Y_i$ for each execution result $(X_i)$ and each combination of at least two execution results $(X_i, X_{i+1})$, wherein the single execution score of the execution result $(X_i)$ and the combined execution score of the combination of at least two execution results $(X_i, X_{i+1})$ are obtained when the execution result $(X_i)$ and the combination of at least two execution results $(X_i, X_{i+1})$ match their corresponding targeted effect $Y_i$;

determining at least one independent function $f_i$ and least one combination function $F_i$ for calculating the reward score, wherein the independent function f comprises at least one execution result $(X_i)$ selected from the plurality of execution results, and the combination function F comprises at least two execution results $(X_i, X_{i+1})$ selected from the plurality of execution results, and wherein the independent function $f_i$ and the combination function $F_i$ are expected to output an optimized score when the execution result $X_i$ matches the targeted effect $Y_i$;

determining a reward score for the execution result to be taken based on a score evaluation function:

$$Rt = W_1 \times f_1(X_1) + W_2 F_2 \times F_2(X_2, X_3) \ldots$$

wherein Rt is the reward score and $W_i$ is a weight predetermined corresponding to each execution result $X_i$;

inputting the reward score for the execution result to be taken to the deep learning algorithm; and adjusting, by the deep learning algorithm, the state of the execution environment based on the reward score for the execution result to be taken; and updating, by the deep learning algorithm, the received content;

and continuously updating, by the trained deep learning algorithm, distribution of content to the user by constantly obtaining a plurality of current execution results associated with the user and constantly determining updated reward scores based on the plurality of current execution results.

18. The computer-implemented system according to claim 17, wherein the plurality of execution results are obtained based on an interaction behavior of the user obtained from a server or an operation behavior of the user obtained from an interface of a client device operated by the user.

19. The computer-implemented system according to claim 17, wherein the plurality of targeted effects on the marketing effect chain comprise delivery of marketing information, first and subsequent clicking of the marketing information, browsing of the marketing information for at least a predetermined amount of time, and placing an order in response to the marketing information.

20. The computer-implemented system according to claim 17, wherein the score evaluation function uses the plurality of execution results $X_i$ as variables and is positively correlated with a match rate between the plurality of execution results $X_i$ and a corresponding plurality of targeted effects $Y_i$.

21. The computer-implemented system according to claim 17, wherein the at least one independent function is generated to be positively correlated with a match rate between corresponding at least one of the plurality of execution results and at least one of the plurality of targeted effects.

22. The computer-implemented system according to claim 17, wherein the plurality of execution results comprise a first execution result that comprises a discrete result value, and the at least one independent function comprises a first function, and the first function outputs a discrete function value based on the discrete result value of the first execution result.

23. The computer-implemented system according to claim 22, wherein the first function outputs a first discrete value when the first execution result has a first result value and outputs a second discrete value when the first execution result has a second result value, wherein the first result value has a higher match rate with a first targeted effect corresponding to the first execution result than the second result value, and the first discrete value is greater than the second discrete value.

24. The computer-implemented system according to claim 17, wherein the deep learning algorithm is further trained by:
  determining a targeted effect combination that matches the plurality of execution results, wherein the targeted effect combination comprises at least a portion of the plurality of targeted effects;
  obtaining a predetermined mapping relationship between the targeted effect combination and the reward score; and
  determining, based on the predetermined mapping relationship, the reward score corresponding to the targeted effect combination.

* * * * *